June 22, 1926.
W. J. SCHMID
TIRE LOCK FOR AUTOMOBILES
Filed July 3, 1924
1,589,433
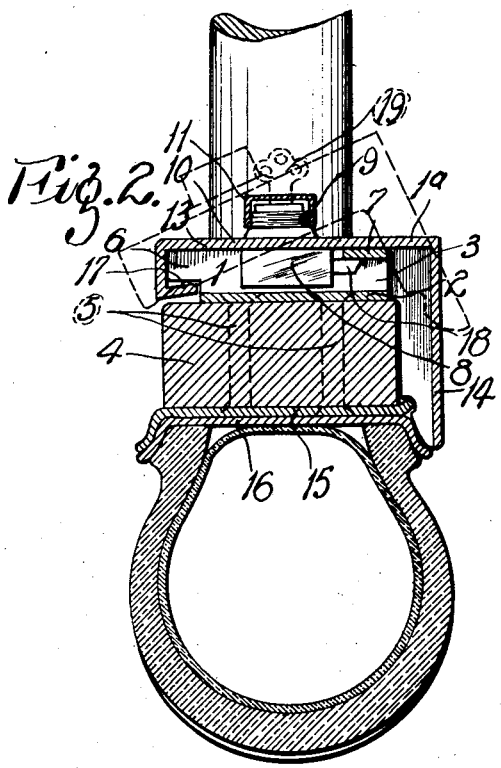
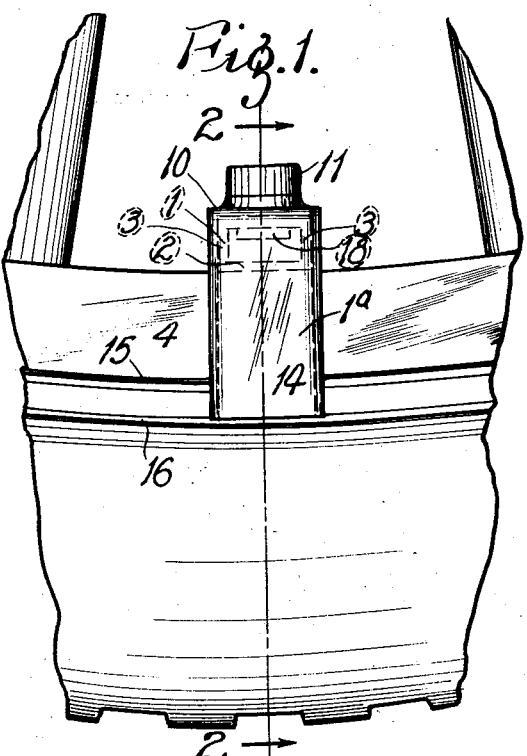
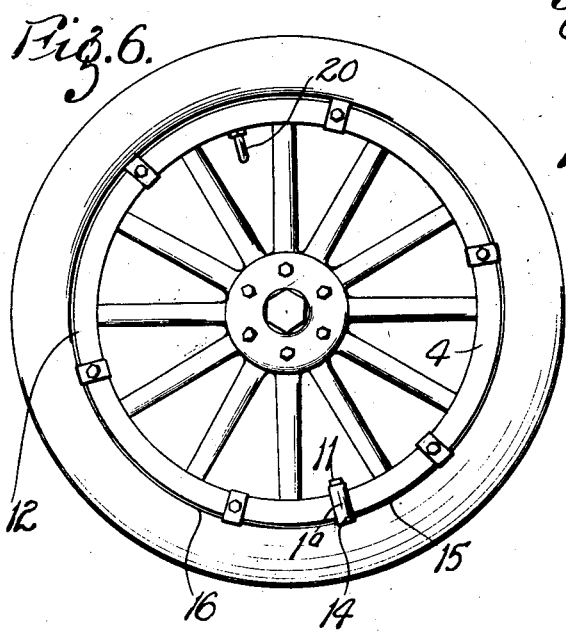
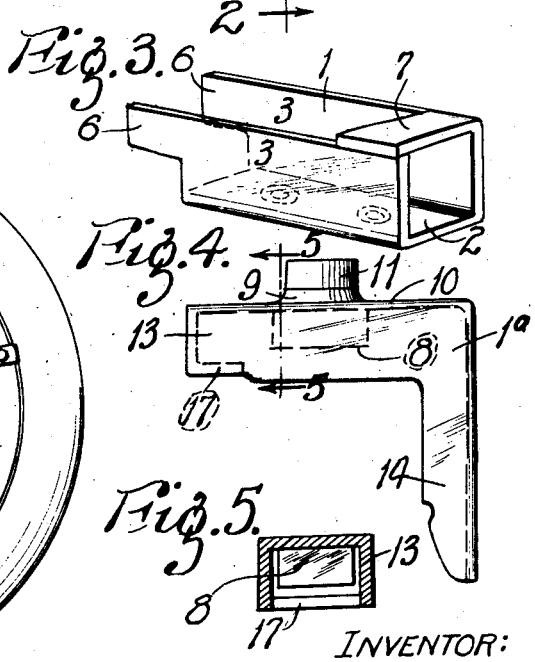
INVENTOR:
WALTER J. SCHMID
BY
ATTORNEY Patented June 22, 1926.

1,589,433

UNITED STATES PATENT OFFICE.

WALTER J. SCHMID, OF ST. LOUIS, MISSOURI.

TIRE LOCK FOR AUTOMOBILES.

Application filed July 3, 1924. Serial No. 723,924.

This invention relates to a device for locking tires to the wheels of automobiles. The object of the invention is to produce a lock which cannot be easily chiseled or pried off, which is inexpensive of construction, compact, and simple in operation, and which, in use, will tend to prevent the unauthorized removal of tires from the wheels to which they are applied.

In the accompanying drawing—

Figure 1 is a side elevation of a portion of an automobile wheel showing my lock affixed thereto;

Figure 2 is a vertical section on the line 2—2 of Figure 1;

Figure 3 is a perspective view of the lock keeper, which is, in practice, secured to the felly of the wheel;

Figure 4 is a side elevation of my lock;

Figure 5 is a vertical section on the line 5—5 of Figure 4; and

Figure 6 is a side elevation of an entire wheel showing the preferred location of the lock, with respect to the valve of the automobile tire.

Referring now to the drawing, the numeral 1 (Figure 3) indicates a lock keeper, which is trough-shaped in cross-section, having a base 2 and side walls 3 extending at right angles thereto. This lock keeper is secured to the wooden felly 4 of the wheel, as by being riveted thereto through the medium of rivets 5, passing through said felly and secured at their outer ends in the base 2 of the lock keeper. Formed at one end of the lock keeper are two extending lugs 6, made by cutting away a portion of the side walls 3 of the lock keeper, and at the other end of the latter, there is provided a bridge 7 which extends from one side wall 3 to the other side wall 3 of the lock keeper. This bridge also acts as a keeper for the bolt of a lock to be subsequently referred to.

The numeral 1ª indicates a lock plate, which comprises two members 13 and 14 extending at right angles to each other and formed integral, the said members being trough-shaped in cross-section, as indicated with respect to the member 13 in Figure 5. The lock plate is preferably cast, or otherwise made, as an integral structure. In its locked position, the member 13 occupies a horizontal position, as shown in Figure 2, and the member 14 extends downward or outward along the side of the felly, and has its lower end cut out or shaped to conform to the configuration of said felly, the steel rim 15 surrounding the felly, and the tire rim 16. On its underside and at its inner end, the member 13 of the lock plate is provided with a flange 17 extending across the same and which, when the lock plate is in position, is adapted to engage under the projecting lugs 6 of the lock keeper.

Secured centrally of the member 13, as by being riveted thereto, is a lock 8, the keyhole or tumbler portion 9 whereof extends upwardly through the top wall 10 of the lock plate. To prevent dust and dirt accumulating in the lock, I provide a cover or cap 11, adapted to screw on the portion 9. The bridge 7 is disposed at that end of the lock keeper which is positioned at the outer side of the wheel 12. The lock 8 is provided with a bolt 18, which is adapted to engage under the bridge 7 to prevent the removal of the lock plate.

In operation, the lock plate is applied by inserting the flange 17 under the lug 6, as indicated in dotted lines in Figure 2, and using this connection as a pivot, the lock plate is turned downward to cause the portion 14 thereof to embrace the side of the felly, the metal rim, and the tire rim, as stated above. The bolt 18 is now turned outward to engage under the bridge 7, by the use of a suitable key 19. This securely locks the locking plate in position, and as its edges fit snugly against the various parts of the wheel and tire rim, it would be practically impossible to insert a chisel, or the like, under the edges of said lock plate for the purpose of prying it away from the lockkeeper. Without the removal of this lock plate, moreover, it is impossible to remove the tire from the wheel, as the engagement of the end of the member 14 of the lock plate will, of course, prevent the removal of the tire rim.

In Figure 6, I have shown my improved lock to be located on the opposite side of the wheel with respect to the tire valve 20. The tire valve itself will prevent the removal of the tire and rim from the wheel, as it projects through the felly of the wheel, and as my lock prevents the removal of the rim at the opposite side of the wheel, it will be, to all intents and purposes, impossible to remove the tire from the wheel without first operating the lock to withdraw the bolt 18 from its locking engagement with bridge 7.

It will be obvious that my invention is particularly applicable to straight-side tires that can be removed from the tire rim only by opening the latter at the split provided therein to reduce its circumference.

In the accompanying drawing, I have shown the preferred and best embodiment of my invention now known to me, but I do not wish to be limited to precise details of construction, as it will be apparent that various modifications of the precise construction shown could be made without departing from the broad scope of the invention as outlined in the appended claims.

I claim:

1. An automobile tire lock comprising, in combination with the felly of the wheel, a lock keeper rigidly secured on the inner circumferential face of the felly and extending substantially from side to side thereof, and a portable locking member open on one side and carrying a lock and adapted to be applied over and locked in position on the said keeper and having a member snugly engaging a metal rim on which the tire is mounted.

2. An automobile tire lock comprising, in combination with the felly of the wheel, a lock keeper rigidly secured on the inner circumferential face of the felly and extending substantially parallel thereto transversely of the felly, and a trough-shaped locking member carrying a lock and adapted to be applied over and conceal said lock keeper and to be locked in position thereon and having at one end an integral member extending at right angles thereto and snugly engaging the metal rim on which the tire is mounted.

3. An automobile tire lock comprising, in combination with the felly of the wheel, a lock keeper rigidly secured on the inner circumferential face of the felly and extending transversely thereon substantially from side to side thereof, and a removable locking member open on one side and carrying a lock and adapted to be applied over and locked in position on said keeper and having at one end a member engaging under said keeper and at its other end an integral member extending along the side of the felly and having its outer end snugly engaging the metal rim on which the tire is mounted.

4. An automobile tire lock comprising, in combination with the felly of the wheel, a lock keeper rigidly secured on the inner circumferential face of the felly and extending transversely thereof and having at its inner end a projection, and a portable locking member open on one side and carrying a lock and adapted to be applied over and locked in position on said keeper and having at its inner end a member adapted to be inserted under said projection, and at its opposite end, an integral member extending at right angles thereto and adapted to snugly engage at its outer end the metal rim on which the tire is mounted.

5. An automobile tire lock comprising, in combination with the felly of the wheel, a lock keeper secured thereto and extending transversely thereof, said lock keeper having at its inner end a pair of projecting lugs and at its outer end a keeper, and a removable locking plate adapted to be applied to said keeper and comprising two members extending at right angles to each other, one of said members having at its inner end a flange adapted to engage under said lugs, and the other member extending along the side of the felly and adapted to engage at its outer end the metal rim on which the tire is mounted, and a lock mounted on said first member and provided with a bolt adapted to be turned into engagement with said keeper when the locking plate is applied to said locking member.

6. An automobile tire lock comprising, in combination with the felly of the wheel, a lock keeper secured thereto and extending transversely thereof, said lock keeper comprising a trough-shaped member having a portion of its side walls extended at one end to provide lugs and having a bridge piece extending between its walls at its other end, a locking plate adapted to be applied to said lock keeper and comprising two members extending at right angles to each other and trough-shaped in cross-section, one of said members being provided on its underside at its end with a cross piece adapted to be inserted under said lugs, and the other member being shaped to snugly engage the side of the felly and the side of the metal rim on which the tire is mounted, and a lock on said first member having a bolt adapted to be turned under and into engagement with said bridge piece.

7. An automobile tire lock comprising, in combination with the felly of the wheel, a lock keeper secured thereto and extending transversely thereof, and provided with an engaging member at one end and a keeper at its other end, a locking plate having a trough-shaped member adapted to fit over said lock keeper and having a recess in one end adapted to receive said engaging member, and having a member extending at right angles from its other end, the outer end of which is adapted to engage the metal rim on which the tire is mounted, and a lock mounted on said trough-shaped member and provided with a bolt adapted to be turned into engagement with said keeper.

8. An automobile tire lock comprising, in combination with the felly of the wheel, a lock keeper rigidly secured thereto, a portable hollow locking member carrying a lock and adapted to be applied to and locked in position on said keeper and having a member snugly engaging the metal rim on which the tire is mounted, said locking member, when in position, enclosing said lock keeper.

In testimony whereof, I have hereunto set my hand.

WALTER J. SCHMID.